(12) United States Patent
Maddury et al.

(10) Patent No.: US 7,191,333 B1
(45) Date of Patent: Mar. 13, 2007

(54) METHOD AND APPARATUS FOR CALCULATING A MULTIPLICATIVE INVERSE OF AN ELEMENT OF A PRIME FIELD

(75) Inventors: Mahesh S. Maddury, Santa Clara, CA (US); Kenneth J. Tomei, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 10/040,050

(22) Filed: Oct. 25, 2001

(51) Int. Cl.
*H03K 19/00* (2006.01)
*G06F 7/04* (2006.01)
*G06F 7/556* (2006.01)

(52) U.S. Cl. .................. 713/174; 713/176; 713/180; 726/6; 726/17

(58) Field of Classification Search .............. 713/161, 713/180, 200; 708/135, 190, 490, 504; 380/277, 380/28–30; 705/50
See application file for complete search history.

(56) References Cited

U.S. PATENT DOCUMENTS

| | | | | |
|---|---|---|---|---|
| 4,405,829 A | * | 9/1983 | Rivest et al. | 380/30 |
| 4,759,063 A | * | 7/1988 | Chaum | 380/30 |
| 4,891,781 A | * | 1/1990 | Omura | 708/670 |
| 5,414,772 A | * | 5/1995 | Naccache et al. | 380/46 |
| 5,928,315 A | | 7/1999 | Kobayashi et al. | 708/491 |
| 5,982,900 A | | 11/1999 | Ebihara et al. | 380/30 |
| 6,064,740 A | | 5/2000 | Curiger et al. | 380/265 |

OTHER PUBLICATIONS

Schneier, "Applied Cryptography", 1996, John Wiley and Sons, Inc., 2nd Edition, pp. 248-249.*
B. Schneier, "Applied Cryptography: Protocols, Algorithms, and Source Code in C" (New York: John Wiley & Sons), 2nd ed. 1996, pp. 246-250, pp. 466-474, pp. 483-494.

* cited by examiner

*Primary Examiner*—Kambiz Zand
*Assistant Examiner*—William S Powers
(74) *Attorney, Agent, or Firm*—Hickman Palermo Truong & Becker LLP (57) ABSTRACT

Techniques for implementing a digital signature algorithm in electronic computer hardware include computing the multiplicative inverse of a particular integer modulo a prime modulus by computing a first quantity modulo the prime modulus. The first quantity substantially equals, modulo the prime modulus, the particular integer raised to a power of a second quantity. The second quantity is two less than the prime modulus. The techniques allow an integrated circuit block to compute a modulo multiplicative inverse, such as for signing and verifying digital signatures, using existing blocks of circuitry that consume considerably less area on a chip, and incur fewer developmental costs, than an implementation of an algorithm conventionally used in software.

15 Claims, 6 Drawing Sheets

METHOD AND APPARATUS FOR CALCULATING A MULTIPLICATIVE INVERSE OF AN ELEMENT OF A PRIME FIELD

FIELD OF THE INVENTION

The present invention generally relates to cryptography and digital signatures for secure computer networking. The invention relates more specifically to a method and apparatus for calculating a multiplicative inverse of an element of a prime field in computer hardware.

BACKGROUND OF THE INVENTION

A digital signature, like a handwritten signature, is affixed to a message as proof of authenticity that the message came from a single entity associated with the signature. Two widely used encryption protocols that can be used to create digital signatures include RSA invented by Rivest, Shamir and Adleman, and the Digital Signature Algorithm (DSA) promulgated by the National Institute of Standards and Technology (NIST). RSA and DSA are described in the reference *Applied Cryptography, Protocols, Algorithms, and Source Code in C*, by Bruce Schneier, 1996, John Wiley & Sons, New York. The DSA is used as the basis of the government Digital Signature Standard (DSS). Use of DSA is required in many popular network security protocols such as Secure Sockets Layer (SSL) and Internet security protocol (IPSec).

Both RSA and DSA employ public key cryptography techniques based on two keys known as a public key and a private key. The two keys are mathematically related, but the private key cannot be determined from the public key. In a system implementing public key technology, each party has its own public/private key pair. The public key can be known by anyone; however, no one should be able to modify it. The private key is kept secret. Its use should be controlled by its owner and it should be protected against modification as well as disclosure.

In general, in public key cryptography, a sender uses the recipient's public key to encrypt a plaintext message; the resulting encrypted message is known as ciphertext. The plaintext may comprise data for text, voice, images, video, or any other data. The ciphertext is sent to a recipient. The recipient can decrypt the message by providing the recipient's private key to a decryption algorithm that processes the message. Because deriving either party's private key from either party's public key is mathematically impractical, a malicious party cannot practically decrypt the message.

To affix a digital signature to a message, a digest of the message is created, the digest is encrypted, resulting in a digital signature. The digital signature is attached to the message, which may be either plaintext or ciphertext, and sent along with the message. In one approach, the message digest is generated using a one-way hash function such as Secure Hash Algorithm (SHA) or MD5. Such functions generate a numeric hash value that is the same every time the same input is passed to the hash function, but produces a different hash when even a slightly different input is passed. It is practically impossible to generate a second sensible input stream that produces the same hash as a different first input stream. The hash practically guarantees that the signature is associated with a particular document.

The security of both RSA and DSA lies in the mathematical difficulty in factoring large integer values (whole numbers with hundreds of decimal digits). Factoring a particular integer means determining the unique set of prime numbers that, multiplied together, form the particular integer. A prime number is a number that has as factors only the number itself and the number one. Both RSA and DSA also employ modulo arithmetic in which intermediate and final results are expressed as an integer in the range from 0 to m−1 for a number m called a modulus. The modulo operation is here represented by the term "mod." The modulo operation has two parameters, the modulus m and an integer a, and one result, the integer b such that a=b+k*m for some integer k. Effectively, the output b of the modulo operation is the remainder, or residue, of dividing the input integer a by the modulus m. If a is less than m, then b is the same as a. The modulo operation is herein stated as "a modulo m equals b" and written as $$a \bmod m = b \qquad (1).$$

Alternatively, this is stated as "a is equivalent to b modulo m" and written as $$a \equiv b[\bmod m] \qquad (2).$$

where [mod m] in square brackets indicates the immediately preceding number or variable is the output of the modulo operation. That is, the integer b always lies between 0 and m−1, whereas the integer a need not. In many cases, the modulus m is related to the size in binary digits (bits) of the field used to store the integer.

Both the RSA and DSA algorithms include at least one step that involves obtaining the multiplicative inverse, modulo m, of an integer a. The multiplicative inverse modulo m of a is represented by $a^{-1}$. By definition, $$(a*a^{-1}) \bmod m = 1 \qquad (3)$$

For example, for modulus 11, the multiplicative inverse of 3 is 4 because $$(3*4) \bmod 11 = (12) \bmod 11 = 1 \qquad (4).$$

The values 15 and 26, which also yield 1, are equivalent to 4 [mod 11].

In conventional systems implementing RSA and DSA, the extended Euclidean algorithm (EEA) is used to compute the multiplicative inverse of an integer a modulo m. The EEA is iterative and can be slow for large numbers. Both RSA and DSA use very large numbers, some numbers expressed with over a thousand bits. Most computations on digital computers are based on numbers expressed in fewer bits, such as 8, 16 or 32 bits.

To increase the speed of the RSA and DSA algorithms, special purpose hardware is sometimes configured to perform some or all of the steps of the algorithms. Such hardware typically takes the form of an application specific integrated circuit (ASIC), a chip, which is composed of separate blocks of circuitry that each performs a certain combination of one or more steps of the computation. The blocks of circuitry are connected so that the output of one block is fed as input to another block. At many steps, a set of parallel connections between blocks is devoted to pass every binary digit (bit) of input and output during each clock cycle. Efficient, thoroughly tested, small footprint blocks have been developed for several modulo computations. For example, existing blocks are available for modulo multiplication (MM) that outputs (a*b) mod m for inputs a, b, m, and for modulo exponentiation (ME) that outputs $(b^a)$ mod m for inputs a, b, m.

A block is needed for computing the modulo multiplicative inverse (MI) that outputs $(a^{-1})$ mod m for inputs a, m.

It is estimated that an MI block that implements the EEA for a DSA or RSA application would take significantly more gates on an integrated circuit than the existing ME block. For example, it may take 25% more gates to implement EEA than are taken in the existing ME block. Because the inputs and outputs are large (between 512 and 1024 bits in the DSA algorithm, so some ASICs are designed to handle 2000 bits or more), the 25% additional gates are on the order of about one million extra gates. The extra area on a chip ("chip real estate") taken by the extra gates limits the number of blocks that can be placed on that chip and therefore limits the number of instances that may be placed on that chip. This then limits the number of messages that can be processed in parallel by any chip or network device built using the chip.

Furthermore, the developmental effort required designing, fabricating, testing, revising, and certifying a new block is a major undertaking even for industry leaders in network device manufacture. The extra effort can significantly increase the time-to-market and impose a competitive disadvantage on the manufacturer that is forced to take the extra development steps.

Based on the foregoing, there is a clear need for an improved MI block that computes a modulo multiplicative inverse and can make use of existing blocks of circuitry for digital signature processing.

In particular, there is a need for a multiplicative inverse block that consumes less area on a chip and incurs fewer developmental costs than an implementation of the EEA.

SUMMARY OF THE INVENTION

The foregoing needs, and other needs and objects that will become apparent for the following description, are achieved in the present invention, which comprises, in one aspect, a method for implementing a digital signature algorithm. The method includes computing the multiplicative inverse of a particular integer modulo a prime modulus by computing a first quantity modulo the prime modulus. The first quantity substantially equals, modulo the prime modulus, the particular integer raised to a power of a second quantity. The second quantity is two less than the prime modulus.

According to an embodiment of this aspect, the method includes substituting a second set of computations for a first set of computations. The first set of computations includes determining a multiplicative inverse of a first integer modulo a first modulus. The second set of computations includes computing the multiplicative inverse of the particular integer modulo the prime modulus. In another embodiment, the second set of computations does not include determining a multiplicative inverse modulo a modulus that is not a prime number.

According to another aspect of the invention, a method for generating an output signal indicating a multiplicative inverse of an integer modulo a prime modulus includes sending a first signal to a base input of a modulo exponentiation block. The first signal indicates a value of the integer. A second signal is sent to a modulus input of the modulo exponentiation block. The second signal indicates a value of the prime modulus. A third signal is sent to an exponent input of the modulo exponentiation block. The third signal indicates a value of the prime modulus less two. The modulo exponentiation block generates an output based on a first quantity modulo a value at the modulus input. The first quantity substantially equals, modulo the value at the modulus input, a value at the base input raised to a power of a value at the exponent input.

According to another aspect of the invention, a method for fabricating a circuit that generates an output signal indicating a multiplicative inverse of an integer modulo a prime modulus includes connecting a first register to a base input of a modulo exponentiation block. The first register holds signals indicating a value of the integer. A second register is connected to a modulus input of the modulo exponentiation block. The second register holds signals indicating a value of the prime modulus. A third register is connected to an exponent input of the modulo exponentiation block. The third register holds signals indicating a value of the prime modulus less two.

According to another aspect of the invention, an apparatus for generating an output signal indicating a multiplicative inverse of an integer modulo a prime modulus includes a modulo exponentiation block. A first input is connected to the base input. The first input is configured for receiving a first signal indicating a value of the integer. A second input is connected to the modulus input. The second input is configured for receiving a second signal indicating a value of the prime modulus. The second input is also connected to a circuit. The circuit is configured to generate on a first output a third signal indicating a value of the prime modulus less two. The first output is connected to the exponent input.

According to another aspect of the invention, an apparatus for performing a particular operation for using digital signatures on a network includes a modulo exponentiation block configured for producing a multiplicative inverse of an integer modulo a prime modulus.

According to an embodiment of this aspect, the particular operation is performed in a series of sequential computations accomplished over a corresponding series of computation cycles. Connections of the apparatus are configured to use the modulo exponentiation block during several computation cycles of the series of computation cycles.

The techniques allow an integrated circuit block to compute a modulo multiplicative inverse using existing blocks of circuitry that consume considerably less area on a chip, and incur fewer developmental costs, than an implementation of an algorithm conventionally used in software.

In other aspects, the invention encompasses a computer readable medium, including a carrier wave, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for generating a modulo multiplicative inverse is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

| | |
|---|---|
| 1.0 | OPERATIONAL CONTEXT |
| 2.0 | FUNCTIONAL OVERVIEW |
| 3.0 | STRUCTURAL OVERVIEW |
| 4.0 | DIGITAL SIGNATURE EXAMPLE |
| 5.0 | METHOD OF USING MODULO EXPONENTIATION |
| 6.0 | HARDWARE OVERVIEW |
| 7.0 | EXTENSIONS AND ALTERNATIVES |

1.0 Operational Context

To illustrate the use of a modulo multiplicative inverse apparatus, it is assumed that an electronic integrated circuit is fabricated for generating a digital signature according to the Digital Signature Algorithm (DSA) proposed for use in a Digital Signature Standard (DSS) by the National Institute of Standards and Technology (NIST) in 1991. However, embodiments of the invention are not limited to this context, but may be employed in other contexts as well. For example, embodiments may be employed as a means of designing such circuitry, as a software means for generating the digital signature, as a hardware or software means of verifying DSA signatures, as a hardware or software component of other digital signature protocols, such as RSA, or in other computations involving multiplicative inverses modulo a modulus m.

DSA makes use of the numeric integer parameters L, P, Q, H and G which are public and shared among a group of users. The parameter L is a multiple of 64 between 512 (=64*8) and 1024 (=64*16), inclusive. L indicates the size of some of the other parameters in terms of the number of bits. That is, L is defined by the following equation $$L=64*I, \text{ where } I \text{ is an element of the set } \{8, 9, \ldots, 16\} \quad (5)$$

The parameter P is a prime integer having L bits. Therefore P is a prime number in the exclusive range given by the following inequality.

$$2^{L-1}<P<2^L, \text{ where } P \text{ is an element of the set of prime numbers} \quad (6)$$

The parameter Q is a 160-bit prime divisor of the quantity (P−1). That is, Q is defined by the next two expressions.

$$2^{159}<Q<2^{160}, \text{ where } Q \text{ is an element of the set of prime numbers} \quad (7)$$

$$(P-1)=Q*J, \text{ where } J \text{ is an integer} \quad (8)$$

The parameter H is an integer less than the quantity (P−1) that avoids particular conditions as given by the following equations.

$$1<H<(P-1), \text{ where } H \text{ is an integer} \quad (9)$$

$$H^{(P-1)/Q} \bmod P > 1 \quad (10)$$

The parameter G is an integer given by the following equations.

$$G=H^{(P-1)/Q} \bmod P \quad (11)$$

By virtue of the property given in expression (10), G is greater than 1 and may have a size that is up to L bits.

The DSA makes use of the integer parameters X, Y and K for an individual digital signature representing an entity. The entity may be an individual or a mutually trusting group of individuals. The parameters X and K are used only in generating a digital signature for the entity. The parameter Y is used only during verifying the digital signature.

The parameter X is a private key for the entity, defined as a randomly generated or pseudo-randomly generated integer in the following range.

$$0<X<Q \quad (12)$$

The parameter K is defined as a randomly generated or pseudo-randomly generated integer in the following range.

$$0<K<Q \quad (13)$$

The parameter Y is the public key for the entity, defined in the following expression.

$$Y=G^X \bmod P \quad (14)$$

The value of Y is made public but not the value of X. A person who knows only Y, G and P cannot practically determine the value X. The values of Y, G and P are so large that current computers would have to operate for an impractical period of time to try all the possibilities.

To affix a signature to a document or message M, the numbers R and S are computed and attached to the document. The computation of S includes passing the message M into a one-way hash function, such as the Secure Hash Algorithm (SHA). The output of the SHA for a given input M is herein indicated by SHA(M). The computations of R and S are given by the next two expressions.

$$R=(G^K \bmod P) \bmod Q \quad (15)$$

$$S=(K^{-1}[SHA(M)+X*R]) \bmod Q \quad (16)$$

Where $K^{-1}$ indicates the multiplicative inverse of integer K modulo Q.

To verify a signature made up of the numbers R and S attached to the message M, a number V is computed and compared to R. If V equals R, then the signature is verified for that message M. The computation of V is given by the next four expressions.

$$W=S^{-1} \bmod Q \quad (17)$$

$$U1=(W*SHA(M)) \bmod Q \quad (18)$$

$$U2=(W*R) \bmod Q \quad (19)$$

$$V=([G^{U1}*Y^{U2}] \bmod P) \bmod Q \quad (20)$$

Where $S^{-1}$ indicates the multiplicative inverse of integer S modulo Q.

2.0 Functional Overview

According to embodiments of the invention, modulo multiplicative inverse operations applicable to DSA, RSA, etc., are computed using an exponentiation approach based, in part, on making use of Euler's theorem for two integers that are relatively prime.

By definition, two integers are relatively prime if they share no prime factor other than the factor 1. For example, 15 and 16 are relatively prime because the prime factors of 15 are {1,3,5} and the prime factors of 16 are {1,2}. The totient function $\phi(n)$ of a positive integer n gives the number of positive integers less than n that are relatively prime with respect to n. Note that for a prime number p, $\phi(p)=p-1$, because every number from 1 through p-1 is relatively prime with respect to a prime number p.

According to Euler's theorem, for two positive numbers a and b that are relatively prime, $$a^{\phi(b)} = 1 \bmod b \tag{21}$$

This expression can be rewritten as $$a^{\phi(b)-1} = a^{-1} \bmod b \tag{22}$$

For b equal to a positive prime number p, this expression becomes $$a^{p-2} = a^{-1} \bmod p \tag{23}$$

According to embodiments, the equation in expression 23 is used to carry out modulo multiplicative inverse, $a^{p-1}$ mod p, in terms of modulo exponentiation, $a^{p-2}$ mod p.

In DSA, the modulo multiplicative inverse is determined modulo Q where Q is prime in equations 16 and 17, so the relation of expression 23 can be used directly.

In common implementations of RSA the modulo multiplicative inverse is determined modulo P where P is prime, so the relation of expression 23 can be used directly also. During verification in the RSA, the original plain text message M is produced using a public key exponent D and a public key modulus Z on a block of ciphertext C, according to equation 24;

$$M = C^D \bmod Z \tag{24}$$

where the modulus Z is the product of two primes numbers P and Q. That is, $$Z = P*Q \tag{25}$$

where P and Q are prime.

Because P and Q are prime, the Chinese Remainder Theorem (CRT), well known in the art, can be applied to deconstruct the computation in Equation 24 into a pair of equations that can be solved in one-fourth the time using twice the chip area. The parameters DP, DQ are defined as follows $$DP = D \bmod (P-1) \tag{26}$$

$$DQ = D \bmod (Q-1) \tag{27}$$

where DP and DQ are 1024 bit integers. The two smaller equations to be evaluated are equations 28 and 29.

$$MP = C^{DP} \bmod P \tag{28}$$

$$MQ = C^{DQ} \bmod Q \tag{29}$$

The values of MP and MQ are typically computed in parallel using identical hardware including a 1024-bit modular exponentiation (ME) block. The 1024-bit ME block is faster than a 2048-bit ME block needed to compute the message M using equation 24.

After MP and MQ are computed, the original message M is reconstructed by combining MP and MQ. There are two approaches to combining MP and MQ to produce M. The first approach does not involve a modulo multiplicative inverse, but instead defines the parameters FP and FQ as follows $$FP = Q^{P-1} \bmod Z \tag{30}$$

$$FQ = P^{Q-1} \bmod Z \tag{31}$$

FP and FQ are 2048-bit integers. Then, the original message M is reconstructed using equation 32.

$$M = [(MP*FP \bmod Z) + (MQ*FQ \bmod Z)] \bmod Z \tag{32}$$

The second approach does involve a modulo multiplicative inverse. The parameter U is the multiplicative inverse of Q modulo P. That is $$U = Q^{-1} \bmod P \tag{33}$$

In addition, this approach defines parameters ZP and ZQ as follows.

$$ZP = (C \bmod P)DP \tag{34}$$

$$ZQ = (C \bmod Q)D \tag{35}$$

Then the original message M is reconstructed using equation 36

$$M = \{[(ZP - \{ZQ \bmod P\})*U] \bmod P\}*Q + ZQ \tag{36}$$

According to equation 33, the parameter U is the multiplicative inverse of Q modulo the prime number P. Thus equation 23 can be used to evaluate U by performing modulo exponentiation in lieu of the EEA.

3.0 Structural Overview

Figure 1A:
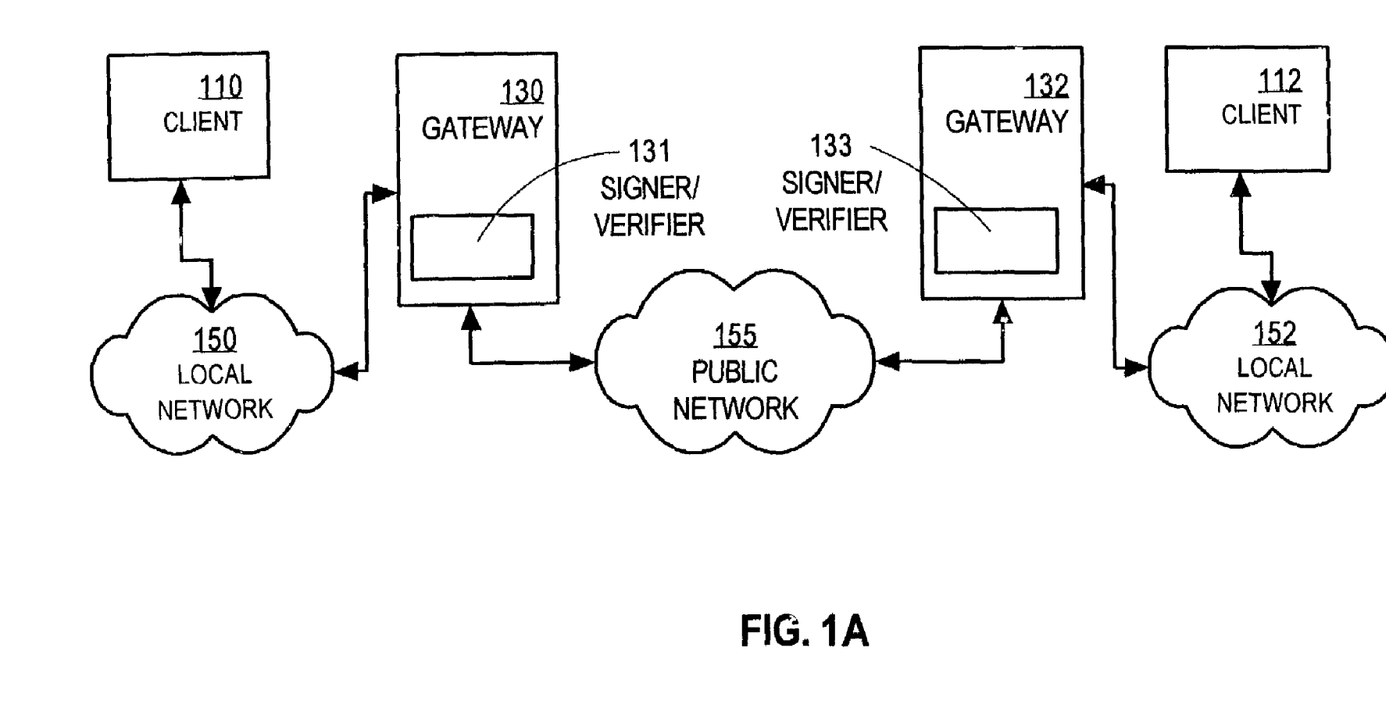
FIG. 1A is a block diagram that illustrates an overview of a network that includes a digital-signature integrated circuit in which an embodiment is implemented.

FIG. 1A is a block diagram that illustrates an overview of a network that includes a digital-signature integrated circuit in which an embodiment is implemented. A client device 110 on a trusted local network 150 is connected to a non-secure, public network 155 through a gateway device 130. Client device 110 may be a network infrastructure element such as a router, switch, etc., that executes an SSL agent or IPSec process, for example. Alternatively, client device 110 may be a software process of an end station device such as a personal computer, workstation, server, etc. The gateway device 130 may be a computer or a network device such as a router. To affix (sign) and verify digital signatures a digital signature ASIC 131 is included in gateway device 130. Elsewhere on the network 155, a second client device 112 is connected through a second local network 152 and a second gateway 132 with a second digital signature ASIC 133.

A first user of a process on client device 110 produces an electronic message M to gateway 130 for signature. A user, in this context, may be a programmatic process or software agent, as well as a human user. The message M may be a flow of data packets, an electronic document, or any other associated electronic data. Based on the address of the client device 130, or some other means of identifying the first user, a process on the gateway invokes the ASIC 131 for signing the document with the shared parameters for the signature algorithm along with the private key for the user and the message M. A signature, (e.g., the numbers R and S of the DSA) is attached to the message M and sent over the public network for client device 112. In some embodiments, the message M and signature are encrypted by another ASIC (not shown) before being sent over the public network.

The information for the client device 112 is received at gateway device 132, which invokes the ASIC 133 for verifying the signature on the document. The gateway device 132 passes the message M and the signature along with the public signature key for the first user to the ASIC 133. In some embodiments in which the message M and signature are encrypted, another ASIC (not shown) is employed to decrypt the received ciphertext before invoking ASIC 133. If the ASIC 133 is able to verify the signature (e.g., the computed value of V equals the received value R for the DSA) then the message M is sent to a process on client device 112 over local network 152 along with a statement that the signature of the first user has been verified.

Figure 1B:
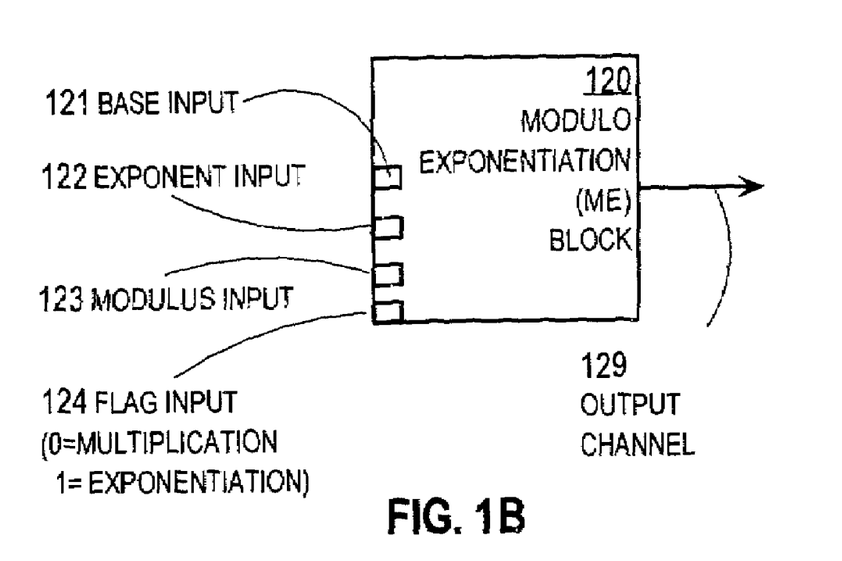
FIG. 1B is a block diagram that illustrates input and output of a modulo exponentiation block, according to an embodiment.

FIG. 1B is a block diagram that illustrates input and output of a modulo exponentiation (ME) circuit block 120, according to an embodiment. ME block 120 evaluates the expression $(b^e)$ mod m for inputs e, b, m. ME block 120 includes input components 121, 122, 123, 124 for receiving signals indicating values for the inputs.

Any manner known in the art for introducing signals to a circuit may be used in the input components described herein. Any manner known in the art for exporting signals from a circuit may be used in the output components described herein. For example, inputs and outputs may be configured to connect to a channel of multiple parallel conductors, one conductor for each bit in the largest number the block is designed to receive or export. To accommodate expansion or changes in algorithms, the number of bits on the input and output may exceed the number of bits required by a current algorithm. For example, the DSA uses a maximum of 1023 bits for values, but the input and output components may be configured for up to 2000 bits.

Base input 121 is configured to receive signals indicating a value for the base b of the exponentiation expression $(b^e)$ mod m. Exponent input 122 is configured to receive signals indicating a value for the exponent e of the exponentiation process $(b^e)$ mod m. Modulus input 123 is configured to receive signals indicating a value for the modulus m of the exponentiation process $(b^e)$ mod m.

In some embodiments, an ME block contains circuitry configured to implement a Montgomery multiplication process that yields a product modulo a modulus equal to the value input. In these embodiments, the ME block may also be used to perform modulo multiplication b*e mod m. According to the illustrated embodiment, ME block 120 includes a flag input 124 configured to receive a signal indicating whether the values at the base and exponent inputs are to be used in exponentiation according to the expression $(b^e)$ mod m, or used in multiplication according to the expression b*e mod m. For example, a signal indicating a value of 0 on the flag input 124 signifies multiplication; and a value of 1 on the flag input 124 signifies exponentiation. Note that the modulo function mod can be evaluated for an integer b using the ME block simply by multiplying by 1. That is, to evaluate b mod m, pass values of b, 1 and m to the ME block to obtain (b*1) mod m=b mod m.

The result of the computation performed by the ME block is output onto output channel 129.

Figure 1C:
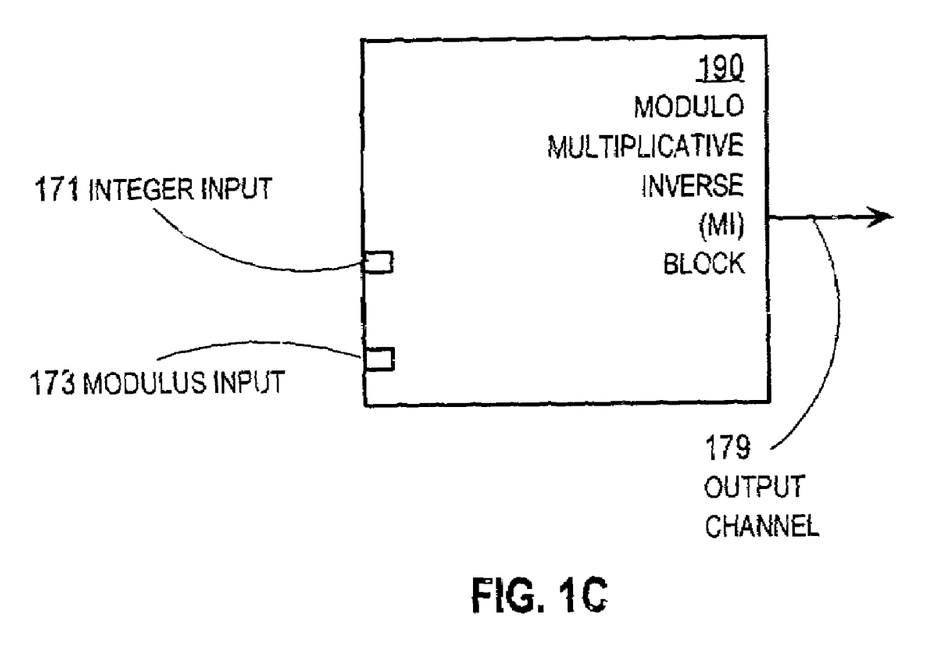
FIG. 1C is a block diagram that illustrates input and output of a hypothetical modulo multiplicative inverse block.

FIG. 1C is a block diagram that illustrates input and output of a hypothetical modulo multiplicative inverse (MI) circuitry block 190. Integer input 171 is configured to receive signals indicating a value for the integer a for the modulo multiplicative inverse expression as described above, $(a^{-1})$ mod m. Modulus input 173 is configured to receive signals indicating a value for the modulus m for the modulo multiplicative inverse expression, $(a^{-1})$ mod m. The result of the computation performed by the MI block is output onto output channel 179.

A MI block 190 that implements the EEA is expected to consume large amounts of chip real estate and substantial development costs. According to embodiments of the present invention, an ME block, such as ME block 120 illustrated in FIG. 1B, which is tested, available, and relatively small in size is used in lieu of the hypothetical MI block in FIG. 1C. According to embodiments, the signals sent to modulus input 123 indicate a prime number p and the signals sent to the exponent input 122 indicate a value of the modulus less 2. That is, m=p, and e=p−2, so that the expression evaluated by the ME block 120 is $$b^{(p-2)} \bmod p \quad (24)$$

which equals the multiplicative inverse of b, according to the equation in expression (23) above. That is:

$$b^{(p-2)} \bmod p = b^{-1} \bmod p \quad (25)$$

and the output channel carries a signal that indicates a value of the multiplicative inverse modulo m for the base b.

In some embodiments a MI block is produced from a ME block by inserting a circuit that subtracts 2 from a value of the modulus and inputs the result as the exponent of the ME block.

4.0 Digital Signature Example

Figure 2:
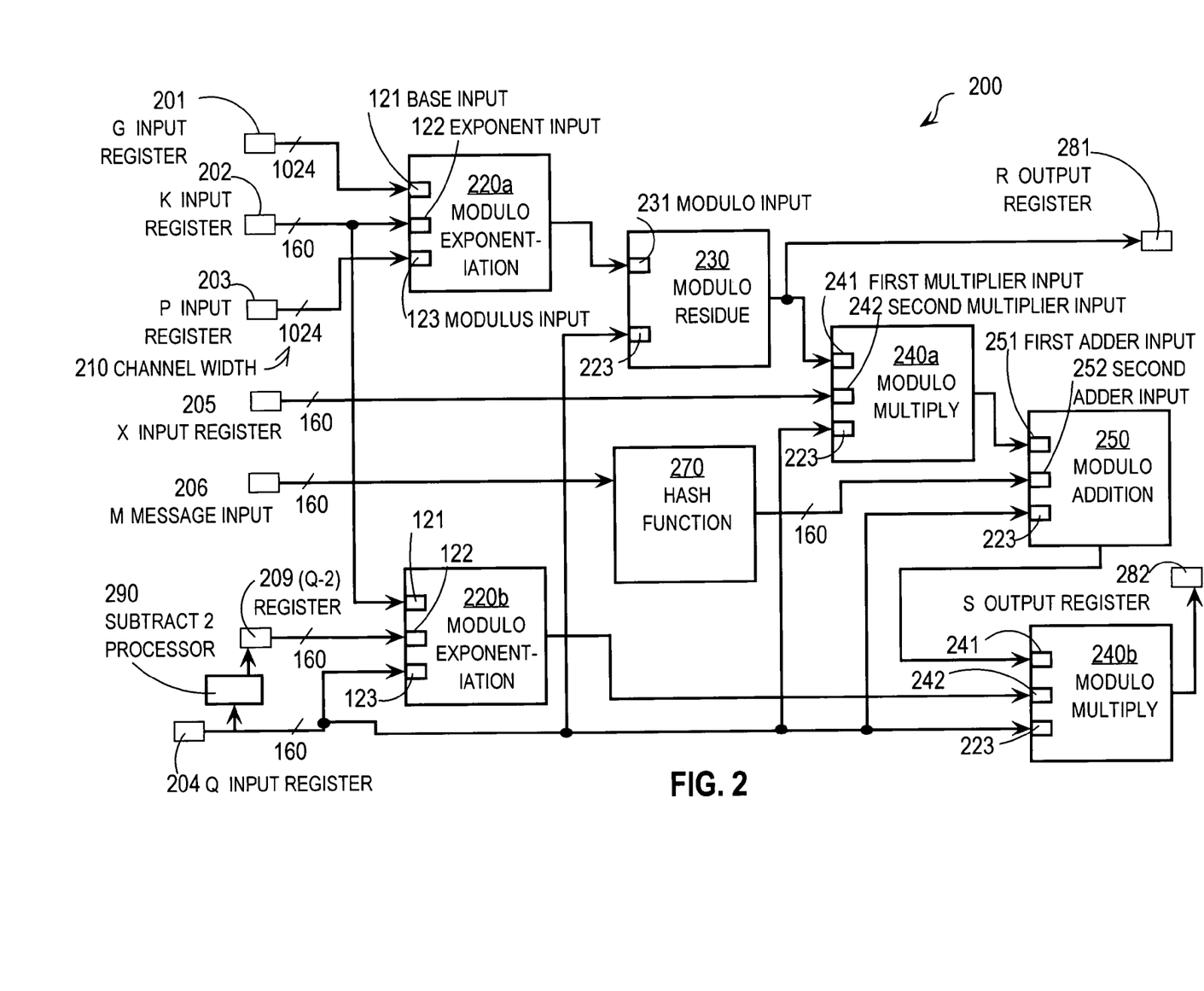
FIG. 2 is a block diagram that illustrates an integrated circuit for generating a digital signature, according to an embodiment.

FIG. 2 is a block diagram that illustrates a portion 200 of an integrated circuit for generating a DSA digital signature according to an embodiment.

The inputs and outputs for this portion of the circuit are represented as signals in particular registers. In other embodiments, other means to introduce values are employed. Here the arrows indicate channels that carry information on parallel conductors. A channel width 210 indicates a number of bits carried by the channel with a number adjacent to a slash that crosses the channel. In other embodiments other means for passing information between components may be used.

According to the illustrated embodiment, signals indicating the values of the DSA inputs G, K, P, Q, X, M are represented as registers 201, 202, 203, 204, 205 and 206, respectively. Signals indicating the values R, S, that constitute the DSA digital signature, are represented as registers 281, 282, respectively.

To evaluate $G^K$ mod P of expression (15), the 1024-bit signal in the G input register 201 is sent to the base input 121 of a first instance 220a of the ME block 120, the 160-bit signal in the K input register 202 is sent to the exponent input 122, and the 1024 bit signal in the P input register 203 is sent to the modulus input 123. Not shown, in order to avoid clutter in the figure, is a flag input signal having a value of 1 to indicate exponentiation.

To complete the evaluation of R in expression (15), the output from ME block 220a modulo Q is computed. The 1024-bit output from ME block 220a is fed to a modulo input 231 of a modulo residue (MR) block 230 that computes the modulo function value. The 160-bit signal in the Q input register 204 is sent to the modulus input 223. The 160-bit output from modulo block 230 is sent to the R output register 281.

To evaluate X*R mod Q of expression (16), the 160-bit signal in the R output from MR block 230 is also sent to first multiplier input 241 of a first instance 240a of an modulo multiplication (MM) block that computes the product of two multipliers modulo a modulus m input at a modulus input 223. The 160-bit signal in the X input register 205 is sent to a second multiplier input 242 of MM block 240a, and the 160-bit signal in the Q input register 204 is sent to a modulus input 223. In some embodiments, another instance of the ME 120 block is used as the MM block 240a, with the flag input 124 holding a signal indicating multiplication instead of exponentiation.

To evaluate [SHA(M)+X*R] mod Q of expression (16), the 160-bit signal output from MM block 240a is sent to a first adder input 251 of a modulo addition (MA) block 250 that computes the sum of two adders modulo a modulus m input at the modulus input 223. The 160-bit signal in the Q input register 204 is sent to a modulus input 223. The message M is sent to a hash function block 270 in 160-bit chunks to evaluate SHA(M). The 160-bit signal output from hash function block 270 is sent to a second adder input 252 of the MA block 250.

To evaluate $K^{-1}$*[SHA(M)+X*R] mod Q of expression (16), the 160-bit signal output from MA block 250 is sent to the first multiplier input 241 of a second instance 240b of a MM block. The 160-bit signal in the Q input register 204 is sent to the modulus input 223. In some embodiments, another instance of the ME 120 block is used as the MM block 240a, with the flag input 124 holding a signal indicating multiplication instead of exponentiation.

According to the illustrated embodiment, a 160-bit signal indicating $K^{-1}$ is sent to the second multiplier 242 from an output of a second instance 220b of the ME block 120. Alternatively, the same instance of the modulo exponentiation block 220a may be re-used in lieu of a second instance 220b, depending upon how a circuit designer wishes to trade-off signal processing speed versus chip real estate, and assuming that the timing of the signals supports such re-use.

To evaluate $K^{-1}$, the 160-bit signal in the Q input register 204 is sent to a processor 290 that subtracts 2 from the value and outputs a signal to the (Q−2) register 209. The 160-bit signal in the K input register 202 is sent to the base input 121 of the second instance 220b of the ME block 120, the 160-bit signal in the (Q−2) register 209 is sent to the exponent input 122, and the 160-bit signal in the Q input register 204 is sent to the modulus input 123. Not shown, in order to avoid clutter in the figure, is a flag input signal having a value of 1 to indicate exponentiation. The output of instance 220b or the ME block is a signal representing the value $K^{-1}$[mod Q].

To complete the evaluation of S in expression (16), the output indicating $K^{-1}$ from ME block 220b is fed to the second multiplier input 232 of the second instance 240b of an MM block. The 160-bit output from MM block 240b is sent to the S output register 282.

Figure 3:
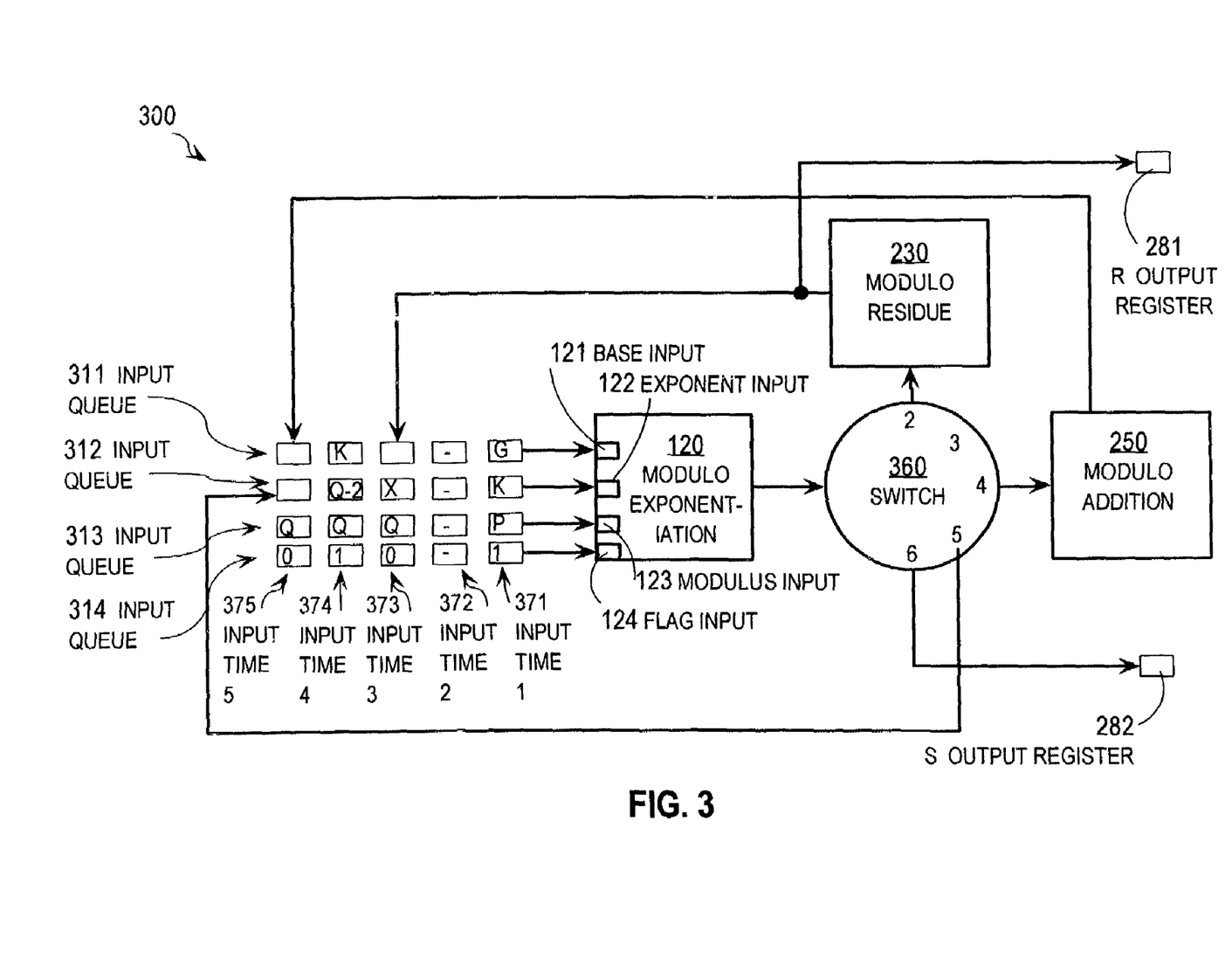
FIG. 3 is a block diagram that illustrates another integrated circuit for generating the digital signature, according to another embodiment.

FIG. 3 is a block diagram that illustrates a portion 300, according to another embodiment, of another integrated circuit for generating the digital signature. In this embodiment, a single instance of a ME block is used repeatedly to compute the numbers R and S of the DSA signature.

In the circuit portion 300 shown in FIG. 3, a single instance of ME block 120 is used along with a MR block 230 and a MA block 250 to produce values for R and S for the DSA signature. The computation of R and S is accomplished in a sequence of five computation cycles numbered 1 through 5. Computation cycle 1 begins at time t1, computation cycle 2 begins at time t2 after computation cycle 1 ends, etc. Circuit portion 300 includes a switch 360 to direct output from the ME block 120 along different channels depending on the computation cycle about to begin. Any circuit known at the time the circuit portion 300 is implemented may be used to switch the output from ME block along different channels during different computation cycles.

The four inputs of the ME block 120 receive signals indicating different values at each computation cycle. This is illustrated in FIG. 3 by four input queues 311, 312, 313, 314 for the base input 121, exponent input 122, modulus input 123, and flag input 124, respectively. The different signals on the four input queues 311, 312, 313, 314 at the start of the 5 different computation cycles are illustrated in FIG. 3 by the five columns of inputs labeled as input times 371, 372, 273, 374, 375.

According to the illustrated embodiment, signals indicating the values of the DSA inputs G, K, P, Q, X occupy one or more of the input queues at one or more start times. Signals indicating the values R, S, that constitute the DSA digital signature, are represented as output registers 281, 282, respectively. Other inputs to the MR block 230 and the MA block 250 are not shown to avoid clutter in the figure. The other inputs to these blocks 230, 250 are the same as illustrated in FIG. 2.

At a time t1 associated with the beginning of the first computation cycle, signals indicating values of the parameters G, K, P are in the first three input queues 311, 312, 313, respectively. A signal indicating the value 1 resides in the input queue 314 to signify that exponentiation rather than multiplication is to be performed. At the start time there is no output from ME block 120, so no channel from switch 360 is labeled "1."

At a time t2 associated with the beginning of the second computation cycle, no signals are input to the ME block. At time t2 the output from ME block 120, indicating a value of $G^K$ mod P, is directed from switch 360 to the MR block 230 as indicated by the channel from a position on the switch labeled "2." During the second computation cycle, the value of R=($G^K$ mod P) mod Q is computed in MR block 230.

At a time t3 associated with the beginning of the third computation cycle, output from MR block 230 is placed into the first input queue 311 and into the R output register 281. Signals indicating values of the parameters X, Q are in the next two input queues 312, 313, respectively. A signal indicating the value 0 resides in the input queue 314 to signify that multiplication is to be performed rather than exponentiation. At time t3, there is no output from ME block 120 because there was no input at time t2. Consequently, no output is directed from switch 360, as indicated by the absence of a channel from a position on the switch labeled "3."

At a time t4 associated with the beginning of the fourth computation cycle, signals indicating values of the parameters K, (Q−2), Q are in the three input queues 311, 312, 313, respectively. A signal indicating the value 1 resides in the input queue 314 to signify that exponentiation is to be performed rather than multiplication. At time t4 the output from ME block 120, indicating a value of X*R mod Q, is directed from switch 360 to the MA block 250 as indicated by the channel from a position on the switch labeled "4." During the fourth computation cycle, the value of $K^{-1}$ mod Q is computed in ME block 120. During the fourth computation cycle, the value of [SHA(M)+X*R] mod Q is computed in MA block 250.

At a time t5 associated with the beginning of the fifth computation cycle, output from MA block 250 is placed into the first input queue 311. Also at time t5, the output from ME block 120, indicating a value of $K^{-1}$ mod Q, is directed from switch 360 to the input queue 312 as indicated by the channel from a position on the switch labeled "5." Signals indicating the value of the parameter Q are in the next input queue 313. A signal indicating the value 0 resides in the input queue 314 to signify that multiplication is to be performed rather than exponentiation. During the fifth computation cycle, the value of $S=K^{-1}[SHA(M)+X*R] \bmod Q$ is computed in MA block 250.

At a time t6 associated with the beginning of the first computation cycle all over again, the output from ME block 120, indicating a value of S, is directed from switch 360 to the S output register 282 as indicated by the channel from a position on the switch labeled "6."

Therefore, FIG. 3 illustrates an embodiment of an apparatus in which a single instance of a ME block is used in several cycles of a sequence of computation cycles for generating a DSA digital signature. It is expected that a circuit built according the embodiment of FIG. 3 uses considerably less chip real estate than a circuit built according to the embodiment of FIG. 2. In any particular embodiment, the actual re-use of one or more blocks in a circuit is a design trade-off between chip real estate used, the timing of the computation cycles, and the complexity of the reuse connections. Furthermore, it is expected that either circuit uses considerably less chip real estate and incurs considerably less development costs than a circuit using an MI block based on the EEA.

According to another embodiment, the MR block 230 is also omitted from the circuit and the ME block is used to compute the residues. According to this embodiment, at time t2 associated with the beginning of the second computation cycle, the output from ME block 120, indicating a value of $G^K \bmod P$, is directed from switch 360 to the input queue 312 by a channel from a position on the switch labeled "2." Signals indicating a value of "1" and a value of the parameters Q are in the next two input queues 312, 313, respectively. A signal indicating the value 0 resides in the input queue 314 for the flag because the residue results when the base is multiplied by 1. During the second computation cycle, the value of $R=(1*G^K \bmod P) \bmod Q=(G^K \bmod P)^1 \bmod Q$ is computed in ME block 120.

In this embodiment, at a time t3 associated with the beginning of the third computation cycle, the output from ME block 120, indicating a value of R, is directed from switch 360 to the input queue 312 by a channel from a position on the switch labeled "3." The channel from output 3 of switch 360 also places a value of R into the R output register 281. Signals indicating values of the parameters X, Q and the value 0 are in the next three input queues 312, 313, 314 respectively, as shown for the first embodiment. Subsequent time steps are as described above for the first embodiment.

5.0 Method of Using Modulo Exponentiation

Figure 4:
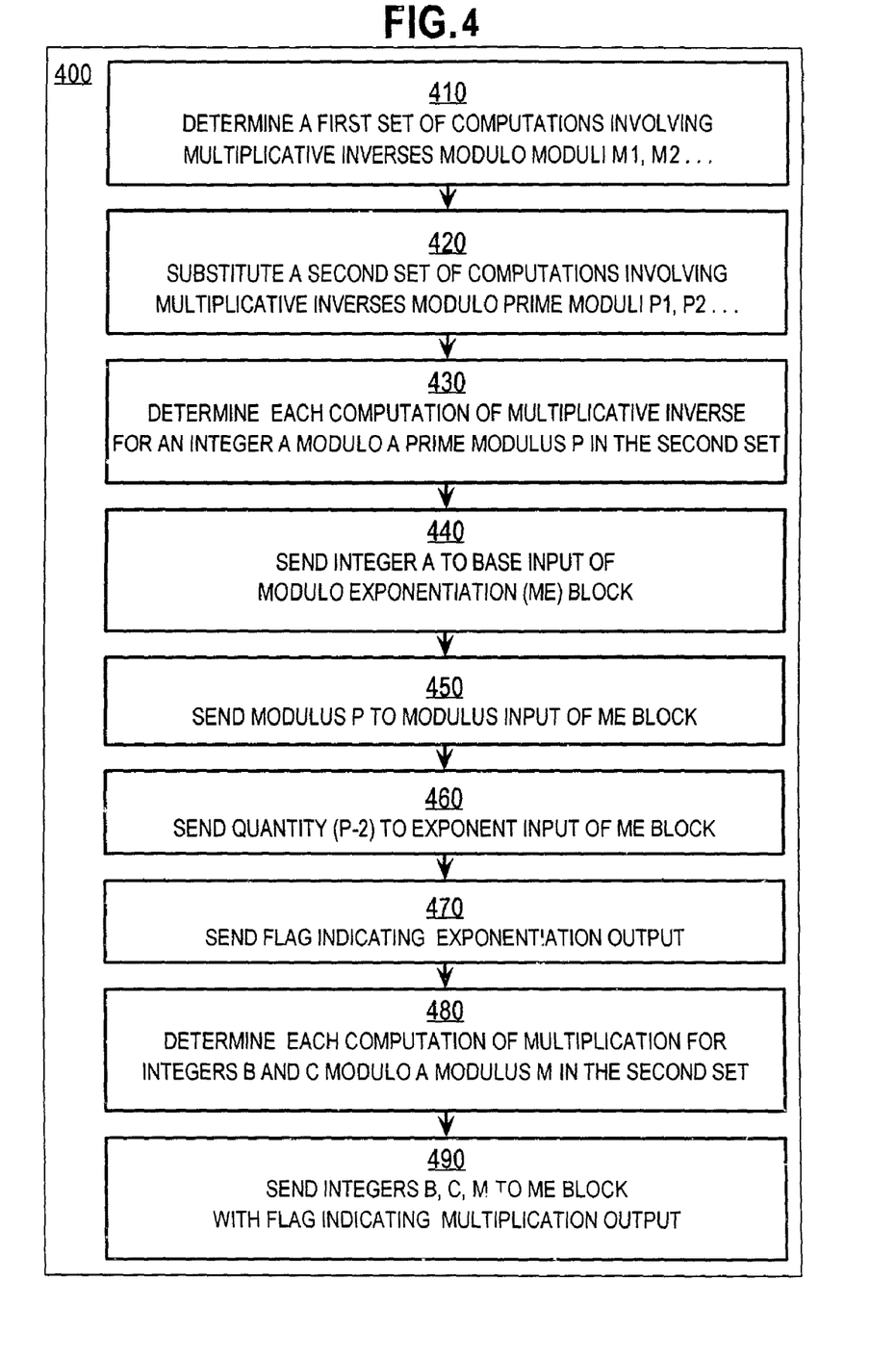
FIG. 4 is a flow diagram that illustrates a high level overview of one embodiment of a method for performing a computation involving a modulo multiplicative inverse, according to an embodiment.

FIG. 4 is a flow diagram that illustrates a high level overview of one embodiment of a method 400 for performing a particular procedure involving a modulo multiplicative inverse.

In step 410, it is determined that a first set of computations of the particular procedure involves one or more multiplicative inverses modulo corresponding prime moduli p1, p2, p3, etc. For example, it is determined that an RSA digital signature involve a multiplicative inverse modulo a prime number.

In step 420, a second set of computations involving multiplicative inverses modulo prime moduli p1, p2, etc., is substituted. For example, a first set of computations that involves the multiplicative inverse modulo moduli m1, m2, etc. is substituted with a second set of computations modulo prime moduli p1, p2, etc., according to expression (23).

In step 430, the computation of one of the multiplicative inverses is determined. For example one of the multiplicative inverses for the inverse of integer A modulo a prime modulus P=p1 is selected.

In step 440, a signal indicating a value for the integer A is sent to the base input of a ME block. As used with respect to FIG. 4, a signal is sent to a block according to any method known in the art. For example, in some embodiments a value of the integer A is used as an input to a software routine that performs modulo exponentiation. In some embodiments associated with designing or fabricating a circuit, a channel that carries the signal is connected to one or more input pins of a ME block implemented as a circuit component. In some embodiments, a register that stores the signal is connected to one or more input pins of a ME block implemented as a circuit component.

In step 450, a signal indicating a value for the modulus P is sent to the modulus input of the ME block.

In step 460, a signal indicating a value for (P−2) is sent to the exponent input of the ME block. In some embodiments, step 460 includes sending the signal indicating the value P to the input of a circuit that subtracts two from a value of a signal on an input. In these embodiments, the output of the circuit is sent as the signal to the exponent input of the ME block.

In step 470, a signal indicating a value of a flag signifying exponentiation rather than multiplication is sent to the ME block. This step is optional in ME blocks that do not permit modulo multiplication to be performed by the ME block.

In step 480, the computation of a modulo multiplication in the first set of computations is determined. This step is omitted in embodiments that do not use the ME block to perform modulo multiplication. For example, a computation of the multiplication of the integers B and C modulo a modulus M=m1 is selected. M may be prime or non-prime. In some embodiments, step 480 includes determining the computation of the value of an integer B modulo M. In such embodiments, the ME block is used to compute a value of B mod M by setting the value of C to "1."

In step 490, signals indicating the values of B, C, M are sent to the base input, exponent input, modulus input, respectively, of the ME block. A signal indicating a value of a flag signifying multiplication rather than exponentiation is sent to the ME block. This step also is omitted in embodiments that do not use the ME block to perform modulo multiplication. In some embodiments, step 480 includes sending signals indicating the values of B, 1, M, 0 to the base input, exponent input, modulus input, flag input, respectively, of the ME block.

Steps 430 through 490 are repeated as appropriate until all residues, multiplications, and multiplicative inverses modulo a prime modulus have been computed in the first set of computations.

6.0 Hardware Overview

Figure 5:
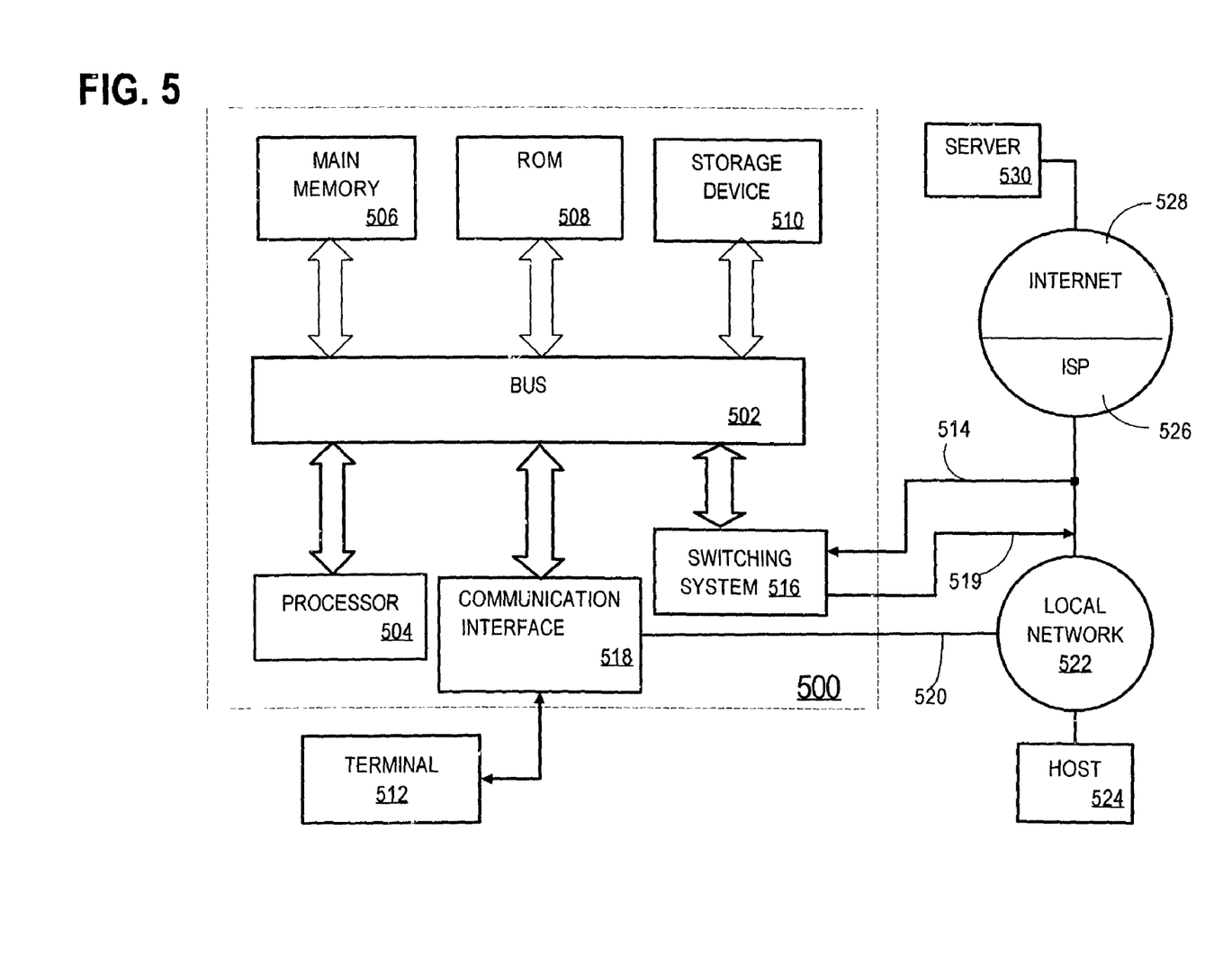
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

An communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for computing multiplicative inverses in a prime field. According to one embodiment of the invention, multiplicative inverses are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for computing multiplicative inverses as described herein.

The received code may be executed by processor 504 as it is received, and/or stored in storage device 510, or other non-volatile storage for later execution. In this manner, computer system 500 may obtain application code in the form of a carrier wave.

7.0 Extensions And Alternatives

In the foregoing specification, the invention has been described with reference to specific embodiments thereof. It

17 will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing method for generating a multiplicative inverse for use in determining a digital signature, the method comprising the computer-implemented steps of:
   receiving and storing a first integer data value relating to a digital signature of an electronic message;
   determining a multiplicative inverse of the first integer data value modulo a prime modulus data value by computing a first quantity modulo the prime modulus data value, wherein said computing includes using a modulo exponentiation block;
   wherein the first quantity equals, modulo the prime modulus data value, the first integer data value raised to a power of a second quantity;
   wherein the second quantity is two less than the prime modulus data value; and
   storing the multiplicative inverse in a computer hardware storage element for use in determining the digital signature of the electronic message.

2. A method for generating an output signal indicating a multiplicative inverse of an integer data value modulo a prime modulus for use in performing a particular operation, the method comprising the steps of:
   sending a first signal, indicating a value of the integer data value, to a base input of a modulo exponentiation block of an electronic integrated circuit;
   sending a second signal, indicating a value of the prime modulus, to a modulus input of the modulo exponentiation block; and
   sending a third signal, indicating a value of the prime modulus less two, to an exponent input of the modulo exponentiation block;
   wherein the modulo exponentiation block generates an output based on a first quantity modulo a value at the modulus input;
   wherein the first quantity equals, modulo the value at the modulus input, a value at the base input raised to a power of a value at the exponent input; and
   wherein the output generated by the modulo exponentiation block is stored in a computer hardware storage element for use in performing a particular operation that is selected from the group consisting of a digital signature algorithm signing operation, a digital signature algorithm verifying operation, an encryption operation for a first electronic message, and a decryption operation for a second electronic message.

3. A method for fabricating an electronic circuit that generates an output signal indicating a multiplicative inverse of an integer data value modulo a prime modulus, the method comprising the steps of:
   connecting a first register holding signals indicating a value of the integer data value to a base input of a modulo exponentiation block;
   connecting a second register holding signals indicating a value of the prime modulus, to a modulus input of the modulo exponentiation block;
   connecting a third register holding signals indicating a value of the prime modulus less two, to an exponent input of the modulo exponentiation block;
   wherein the modulo exponentiation block generates an output based on a first quantity modulo a value at the modulus input; and

18 wherein the first quantity equals, modulo the value at the modulus input, a value at the base input raised to a power of a value at the exponent input.

4. An apparatus for generating an output signal indicating a multiplicative inverse of an integer modulo a prime modulus comprising:
   a modulo exponentiation block configured to generate the output signal based on a first quantity modulo a value at a modulus input, the first quantity equal, modulo the value at the modulus input, to a value at a base input raised to a power of a value at an exponent input;
   a first input for receiving a first signal indicating a value of the integer, the first input connected to the base input;
   a second input for receiving a second signal indicating a value of the prime modulus, the second input connected to the modulus input; and
   a circuit connected to the second input configured to generate on a first output a third signal indicating a value of the prime modulus less two, the first output connected to the exponent input.

5. An apparatus for performing a particular operation for using digital signatures on a network, the apparatus comprising a modulo exponentiation block configured for producing a multiplicative inverse of an integer modulo a prime modulus, wherein:
   said multiplicative inverse of an integer modulo a prime modulus, wherein said multiplicative inverse is used in performing the particular operation;
   the particular operation is performed in a series of sequential computations accomplished over a corresponding series of computation cycles; and
   the apparatus further comprises connections configured to use the modulo exponentiation block during a plurality of computation cycles of the series of computation cycles.

6. The apparatus as recited in claim 5, wherein the apparatus has no circuitry block configured to perform an extended Euclidian algorithm (EEA) and no general-purpose processor configured by instructions to perform the EEA.

7. The apparatus as recited in claim 5, wherein the particular operation is a Rivest, Shamir, and Adleman encrypting operation.

8. The apparatus as recited in claim 5, wherein the particular operation is a Rivest, Shamir, and Adleman decrypting operation.

9. The apparatus as recited in claim 5, wherein the particular operation is a digital signature algorithm signing operation.

10. The apparatus as recited in claim 5, wherein the particular operation is a digital signature algorithm verifying operation.

11. A computer-readable medium carrying one or more sequences of instructions for generating a multiplicative inverse of an integer modulo a prime modulus for use in performing a particular operation, which instructions, when executed by one or more processors, cause the one or more processors to carry out the steps of:
   sending data indicating a value of the integer as an base input to a modulo exponentiation function;
   sending data indicating a value of the prime modulus as an modulus input to the modulo exponentiation function; and
   sending data indicating a value of the prime modulus less two as an exponent input of the modulo exponentiation function, wherein
the modulo exponentiation function generates an output based on a first quantity modulo the modulus input, the first quantity equals, modulo the modulus input, the base input raised to a power of the exponent input; and the output generated by the modulo exponentiation function is used in performing a particular operation that is selected from the group consisting of a digital signature algorithm signing operation, a digital signature algorithm verifying operation, an encryption operation for a first electronic message, and a decryption operation for a second electronic message.

12. The computer-readable medium recited in claim 11, wherein the exponentiation function sends the base input, the modulus input and the exponent input to a special-purpose block of circuitry configured to perform modulo exponentiation.

13. A computer-readable medium carrying one or more sequences of instructions for generating a multiplicative inverse for use in determining a digital signature, which instructions, when executed by one or more processors, cause the one or more processors to carry out the steps of receiving and storing a first integer data value relating to a digital signature of an electronic message;

determining a multiplicative inverse of the first integer data value modulo a prime modulus data value by computing a first quantity modulo the prime modulus data value, wherein said computing includes using a modulo exponentiation block;

wherein the first quantity equals, modulo the prime modulus data value, the first integer data value raised to a power of a second quantity;

wherein the second quantity is two less than the prime modulus data value; and storing the multiplicative inverse in a computer hardware storage element for use in determining the digital signature of the electronic message.

14. An apparatus for generating a multiplicative inverse for use in determining a digital signature, the method comprising the computer-implemented steps of:

means for receiving and storing a first integer data value relating to a digital signature of an electronic message;

means for determining a multiplicative inverse of the first integer data value modulo a prime modulus data value by computing a first quantity modulo the prime modulus data value, wherein said computing includes using a modulo exponentiation block;

wherein the first quantity equals, modulo the prime modulus data value, the first integer data value raised to a power of a second quantity;

wherein the second quantity is two less than the prime modulus data value; and means for storing the multiplicative inverse in a computer hardware storage element for use in determining the digital signature of the electronic message.

15. An apparatus for generating a output signal indicating a multiplicative inverse of an integer data value modulo a prime modulus for use in performing a particular operation, the apparatus comprising:

means for sending a first signal, indicating a value of the integer data value, to a base input of a modulo exponentiation block of an electronic integrated circuit;

means for sending a second signal, indicating a value of the prime modulus, to a modulus input of the modulo exponentiation block; and means for sending a third signal, indicating a value of the prime modulus less two, to an exponent input of the modulo exponentiation block;

wherein the modulo exponentiation block includes means for generating an output based on a first quantity modulo a value at the modulus input;

wherein the first quantity equals, modulo the value at the modulus input, a value at the base input raised to a power of a value at the exponent input; and wherein the output generated by the modulo exponentiation block is stored in a computer hardware storage element for use in performing a particular operation that is selected from the group consisting of a digital signature algorithm signing operation, a digital signature algorithm verifying operation, an encryption operation for a first electronic message, and a decryption operation for a second electronic message.

* * * * *

UNITED STATES PATENT AND TRADEMARK OFFICE
CERTIFICATE OF CORRECTION

PATENT NO. : 7,191,333 B1
APPLICATION NO. : 10/040050
DATED : March 13, 2007
INVENTOR(S) : Mahesh S. Maddury and Kenneth J. Tomei It is certified that error appears in the above-identified patent and that said Letters Patent is hereby corrected as shown below:

Claim 15, Column 20, line 1, replace "a" with --an--

Signed and Sealed this

Twenty-second Day of May, 2007

JON W. DUDAS
*Director of the United States Patent and Trademark Office*